(12) United States Patent
Tipping

(10) Patent No.: US 9,828,770 B2
(45) Date of Patent: Nov. 28, 2017

(54) WALL SHEATHING WITH PASSIVE ENERGY DISSIPATION

(71) Applicant: Steven B. Tipping, El Cerrito, CA (US)

(72) Inventor: Steven B. Tipping, El Cerrito, CA (US)

(*) Notice: Subject to any disclaimer, the term of this patent is extended or adjusted under 35 U.S.C. 154(b) by 69 days.

(21) Appl. No.: 14/668,934

(22) Filed: Mar. 25, 2015

(65) Prior Publication Data

US 2016/0281359 A1 Sep. 29, 2016

Related U.S. Application Data

(60) Provisional application No. 61/970,342, filed on Mar. 25, 2014.

(51) Int. Cl.
  *B32B 3/10* (2006.01)
  *B32B 3/24* (2006.01)
  (Continued)

(52) U.S. Cl.
  CPC .............. *E04C 2/324* (2013.01); *B32B 3/266* (2013.01); *B32B 3/28* (2013.01); *E04C 2/08* (2013.01); *E04C 2/322* (2013.01); *E04H 9/02* (2013.01); *B32B 3/10* (2013.01); *B32B 7/08* (2013.01); *B32B 15/04* (2013.01); *B32B 2307/50* (2013.01); *B32B 2607/00* (2013.01); *E04C 2/26* (2013.01); *Y10T 428/12361* (2015.01); *Y10T 428/24314* (2015.01); *Y10T 428/24322* (2015.01); *Y10T 428/24331* (2015.01); *Y10T 428/24669* (2015.01); *Y10T 428/24694* (2015.01); *Y10T 428/24719* (2015.01); *Y10T 428/249923* (2015.04)

(58) Field of Classification Search
  None
  See application file for complete search history.

(56) References Cited

U.S. PATENT DOCUMENTS 3,604,164 A * 9/1971 Mason .................... E04C 2/322
  52/206
3,668,052 A * 6/1972 Pratt ....................... E04C 2/322
  156/210

(Continued)

FOREIGN PATENT DOCUMENTS

CN 201043372 Y * 4/2008
FR 1434831 A 4/1966

(Continued)

OTHER PUBLICATIONS

Machine Translation of JP 2011127279 A, Jun. 2011.*

(Continued)

*Primary Examiner* — Jeff Vonch
(74) *Attorney, Agent, or Firm* — Kilpatrick Townsend & Stockton LLP

(57) ABSTRACT

A corrugated sheet metal wall sheathing for resisting external excitations such as wind or earthquake of light-framed wall structures. The sheathing has sheet profile proportioned to insure the top flutes deform laterally and yield at the end of the flute before the onset of any failure mode. A transverse slot in included in each top flute and adjacent web of the sheathing and spaced at intervals along the length of the sheathing.

13 Claims, 23 Drawing Sheets

(51) Int. Cl.
  *B32B 3/28*    (2006.01)
  *B32B 7/08*    (2006.01)
  *B32B 15/04*   (2006.01)
  *E04H 9/02*    (2006.01)
  *E04B 2/56*    (2006.01)
  *E04C 2/08*    (2006.01)
  *E04C 2/26*    (2006.01)
  *E04C 2/32*    (2006.01)
  *B32B 3/26*    (2006.01)

(56) References Cited

U.S. PATENT DOCUMENTS

| | | | | |
|---|---|---|---|---|
| 3,861,493 | A * | 1/1975 | Payne | E04B 1/86 |
| | | | | 181/293 |
| 4,106,249 | A * | 8/1978 | Morton | E04B 5/40 |
| | | | | 52/220.4 |
| 4,562,678 | A | 1/1986 | Carroll et al. | |
| 4,695,033 | A * | 9/1987 | Imaeda | E04B 5/40 |
| | | | | 249/112 |
| 5,619,837 | A * | 4/1997 | DiSanto | E04C 2/08 |
| | | | | 52/630 |
| 5,996,292 | A | 12/1999 | Hill et al. | |
| 6,003,283 | A * | 12/1999 | Hull | E04C 2/365 |
| | | | | 52/783.15 |
| 6,112,482 | A * | 9/2000 | Wright | E04B 5/40 |
| | | | | 52/220.4 |
| 6,298,617 | B1 * | 10/2001 | de Quesada | E04B 1/08 |
| | | | | 52/236.3 |
| 6,385,942 | B1 * | 5/2002 | Grossman | E04B 1/14 |
| | | | | 52/630 |
| 7,251,920 | B2 | 8/2007 | Timmerman, Sr. et al. | |
| 8,281,551 | B2 | 10/2012 | Leek et al. | |
| 8,475,894 | B2 | 7/2013 | Noble et al. | |
| 9,441,360 | B2 * | 9/2016 | Matteson | E04C 3/32 |
| 2003/0134091 | A1 * | 7/2003 | Wade | E04C 2/20 |
| | | | | 428/182 |
| 2004/0255533 | A1 * | 12/2004 | Koester | E04B 1/70 |
| | | | | 52/302.1 |
| 2005/0126105 | A1 * | 6/2005 | Leek | E04H 9/02 |
| | | | | 52/633 |
| 2005/0284073 | A1 * | 12/2005 | Leek | E04H 9/02 |
| | | | | 52/580 |
| 2007/0062135 | A1 * | 3/2007 | Mueller | E02D 31/08 |
| | | | | 52/293.3 |
| 2009/0092798 | A1 * | 4/2009 | Snel | E04C 2/08 |
| | | | | 428/182 |
| 2009/0255205 | A1 * | 10/2009 | Noble | B32B 3/10 |
| | | | | 52/630 |
| 2011/0005165 | A1 * | 1/2011 | Stadthagen-Gonzalez | E04C 2/326 |
| | | | | 52/783.1 |
| 2012/0085062 | A1 * | 4/2012 | Neumayr | E04C 2/3405 |
| | | | | 52/578 |
| 2016/0208478 | A1 * | 7/2016 | Matteson | E04C 3/32 |

FOREIGN PATENT DOCUMENTS

| | | | | | |
|---|---|---|---|---|---|
| JP | | 2006037585 | A | * | 2/2006 |
| JP | | 2009091737 | A | * | 4/2009 |
| JP | | 2009249917 | A | * | 10/2009 |
| JP | | 2010090650 | A | * | 4/2010 |
| JP | | 2011127279 | A | * | 6/2011 |
| JP | | 2013002032 | A | * | 1/2013 |
| JP | | 2014167205 | A | * | 9/2014 |
| JP | | 2014167208 | A | * | 9/2014 |
| WO | WO 2010063067 | A1 | * | 6/2010 | ............... E04C 2/08 |

OTHER PUBLICATIONS

Machine Translation of JP 2013002032 A, Jan. 2013.*
Machine Translation of JP 2014167208 A, Sep. 2014.*
Yu, Cold-Formed Steel Framed Shear Wall Sheathed with Corrugated Sheet Steel, May 2013, University of North Texas.*
Lindab Profiled Sheeting Technical Information, Jun. 2010.*
Ludovic et al., Seismic Performance of Wall-stud Shear Wall, Oct. 2002, International Specialty Conference on Cold-Formed Steel Structures.*
Vigh et al., Seismic Performce of Steel Corrugated Walls, Aug. 2012, Stanford Department of Steel Corrugated Shear Walls.*
Davies, Jim M. et al. "End failures in stressed skin diaphragms," Proceedings of the Institution of Civil Engineers, Mar. 1, 1987, part 2, vol. 83, issue 1, pp. 275-293.
Jamison, Jared Bernard Jr., "Monotonic and Cyclic Performance of Structurally Insulated Panel Shear Walls," Masters of Science in Civil Engineering Thesis, Virginia Polytechnic Institute and State University, Dec. 10, 1997, Ch. 2, pp. 5-14, Blacksburg, Virginia, USA, retrieved from the Internet Aug. 30, 2013, at http://scholar.lib.vt.edu/theses/available/etd-111897-223353/unrestricted/ch2.pdf.
Shimizu, Nobutaka et al., "Cyclic Behavior of Corrugated Steel Shear Diaphragms with End Failure," Journal of Structural Engineering, May 2013, pp. 796-806.
Stojadinovic, Bozidar et al., "Structural Testing of Corrugated Sheet Steel Shear Walls," Nineteenth International Specialty Conference on Cold-Formed Steel Structures, Oct. 14-15, 2008, St. Louis, Missouri, USA, 16 pages
Tipping, Steven, "NEES Without Borders," NEES 7th Annual Meeting: Seismic Mitigation in a Flat World , Jun. 23-25, 2009, Honolulu, Hawaii, USA, 43 pages, retrieved from the Internet Aug. 30, 2013, at https://nees.org/site/resources/pdfs/Steven_Tipping.pdf.

* cited by examiner

WALL SHEATHING WITH PASSIVE ENERGY DISSIPATION

CROSS-REFERENCES TO RELATED APPLICATIONS

This application claims the benefit of U.S. Provisional Application No. 61/970,342, filed Mar. 25, 2014, the entirety of which is incorporated by reference herein.

BACKGROUND OF THE INVENTION

This invention generally relates wall sheathing, particularly relates to wall sheathing for the design and construction of wind and seismic force-resisting systems used in building structures.

In order to protect a structure such as a building and the people who may occupy or be in the vicinity of such structures, seismic force-resisting systems have been devised. The International Building Code (IBC) defines many of these systems, one being "light-framed walls sheathed with wood structural panels rated for shear resistance or steel sheets." Light-framed walls are constructed with wood studs or cold-formed steel studs spaced at 16" or 24" on center.

Wood structural panels rated for shear resistance include "plywood" and "OSB" (oriented strand board) which are generic products manufactured by many companies. Sheet metal is also a generic product manufactured by many companies. In addition to these two generic wall sheathing products, there is a wall sheathing product called Sure-Board® by Intermat Inc. While plywood is commonly used with both wood studs and cold-formed steel studs, Sure-Board® is used only with cold-formed steel studs. These wall sheathing products are discussed in more detail below.

The ability of a product or system to dissipate energy can be measured by calculating the area of its hysteresis loop. In structural engineering, hysteresis refers to the path-dependence of a structure's restoring force versus deformation. A hysteresis loop is a graph plotting the force versus deflection data obtained by physically testing a product or system through multiple push-pull cycles. The larger the area of the loop, the more energy dissipated. The area of the loop is dependent on its basic shape (pinched or full) and its length (short or long). For the purposes of this disclosure, the term "pinched" describes the shape of a hysteresis loop that appears to be pinched in the middle, as shown in FIG. 1, compared to a hysteresis loop which is "full," as shown in FIG. 2. A full hysteresis loop indicates the product or system will dissipate more energy than a product or system with a pinched hysteresis loop. For the purposes of this disclosure, the term "short" describes the shape of a hysteresis loop that appears to be short as a measurement of its length, as shown in FIG. 1, compared to a hysteresis loop that is "long," as shown in FIG. 2. A full and long hysteresis loop indicates the product or system will dissipate more energy than a product or system with a pinched and short hysteresis loop. Also, as the displacement capacity of the product or system increases (length of hysteresis loop), its ductility increases. Ductility is defined as a measure of a material's ability to undergo appreciable plastic deformation before fracture. A common way to characterize the displacement capacity of a system or product is by its drift ratio. Drift ratio is calculated by dividing the horizontal displacement taken from the hysteresis loop graph by the height of the specimen tested. This ratio provides a means to compare specimens of varying heights.

Plywood panels are the most common wall sheathing in use today. These panels were introduced in the 1930's and have undergone extensive testing. Plywood panels, which are typically manufactured in 4'×8' sheets, are fastened to wood studs with nails and to cold-formed steel studs with self-tapping screws. Plywood panels are typically much stronger and stiffer than the fastener and/or substrate they are fastened to. This being the case, when subjected to horizontal shear forces induced by wind or earthquake, walls sheathed with plywood panels tend to rack rather than deform, resulting in the nails bending and pulling out of wood studs or the self-tapping screws gouging an elongated hole in the cold-formed steel studs. Both of these general failure modes result in limited displacement capacity and limited energy dissipation of the wall panel. A typical hysteresis loop for plywood sheathing fastened to wood studs is illustrated in FIG. 3 and a typical hysteresis loop for plywood sheathing fastened to cold-formed steel studs is illustrated in FIG. 4. Both of these hysteresis loops are pinched and have limited displacement capacity.

Sheet metal sheathing is used exclusively with cold-formed steel studs and is typically fastened to the studs using self-tapping screws. It should be noted that the sheet metal sheathing is typically flat. While plywood panels are very rigid, sheet metals are relatively flexible and rely on their tensile capacity to provide strength and stiffness. The primary failure mode of the sheet metal sheathing is gouging and tearing of the sheet steel at the fastener when subjected to tension loads and buckling when subjected to compression loads. This failure mode results in limited displacement capacity and limited energy dissipation of the wall panel. A typical hysteresis loop for sheet metal sheathing is illustrated in FIG. 5. Similar to plywood sheathing, the sheet metal sheathing has a pinched hysteresis loop and therefore limited displacement capacity.

As mentioned above, an alternative to plywood and sheet metal sheathing products is Sure-Board®. Sure-Board® consists of a flat metal sheet fastened to a rigid board with an adhesive to form a sheathing panel. By varying the type of rigid board the sheet metal is fastened to, Sure-Board® offers a product line to meet various field conditions. Sure-Board® is typically manufactured in 4'×8' sheets that are fastened to cold-formed steel studs with self-tapping screws. No information is available on the failure mode of the Sure-Board® panels. However, a review of a typical hysteresis loop for a Sure-Board® test panel as illustrated in FIG. 6 shows the same pinched hysteresis loop and limited displacement capacity and limited energy dissipation as plywood and sheet metal sheathing—implying failure occurred at the fastener.

Common to the above noted wall sheathing products is their relative strength and stiffness when compared to the connection that fastens the sheathing to the studs. Typically, panel failure occurs at the connection point, resulting in limited displacement capacity and limited ability to dissipate energy when subjected to external excitations such as wind or earthquake. Accordingly, wall sheathing that resists external excitations such as wind or earthquake of light-framed wall structures with increased displacement capacity and increased energy dissipation is needed.

SUMMARY OF THE INVENTION

The present invention provides a wall sheathing that yields and deforms when subjected to external excitations such as wind or earthquake, thus protecting the connections that fasten the sheathing to the stud. By so doing, the present invention provides increased passive energy dissipation as measured by the fullness and length of its hysteresis loop.

Many embodiments relate to a corrugated sheet metal wall sheathing configured to resist external excitations such as wind or earthquake of light-framed wall structures. A profile of the sheathing is proportioned to insure the top flutes deform laterally and yield at the end of the flute before the onset of any failure mode. A transverse slot is included in each top flute and adjacent web of the sheathing spaced at intervals along the length of the sheathing.

Many embodiments relate to a structural shear panel comprising a corrugated sheet metal panel extending in a first direction and second direction along a plane. The corrugated sheet metal panel includes a plurality of upper flute portions and lower flute portions elongated along the first direction, and a plurality of web portions interconnecting the upper and lower flute portions. A first plurality of openings linearly extend along the second direction through the plurality of upper flute portions and plurality of webs, but not within the lower flute portions. The first plurality of openings are configured such that shear forces applied to the corrugated sheet metal panel cause preferential deformation at the first plurality of openings.

In many embodiments, a slotted sheet metal wall sheathing used to resist external excitations such as wind or earthquake of light-framed wall structures addresses the short comings of the prior art.

In many embodiments, flat sheet metal is cold-formed to create a specific recurring pattern across the width of the sheet that results in a full hysteresis loop when laterally displaced.

In many embodiments, each top flute and adjacent webs are cut transversely (slotted) at intervals over the length of the sheet that results in a long hysteresis loop when laterally displaced.

In many embodiments, a pattern of holes is added to the wall sheathing to act as a template to insure the proper placement of the fasteners.

In many embodiments, the yield strength and gauge of the sheet metal is set to control the shear strength of the sheathing.

In many embodiments, the sheathing can be manufactured in 4'×8' sheets or other custom sizes as requested.

In many embodiments, the sheathing can be installed with the flutes set vertically or horizontally.

In many embodiments, the sheathing can be installed on one side or both sides of the light-framed wall.

In many embodiments, the sheathing can be installed in the field or in a remote location.

In many embodiments, the pluralities of the upper and lower flute portions are orientated 90-100 degrees from the plurality of web portions.

In many embodiments, a second plurality of openings linearly extend along the second direction, and parallel to the first plurality of openings, through the plurality of upper flute portions and plurality of web portions, but not within the lower flute portions.

In many embodiments, a third plurality of openings linearly extend along the second direction, and parallel to the first and second pluralities of openings, through the plurality of upper flute portions and plurality of web portions, but not within the lower flute portions.

In many embodiments, the plurality of webs extend ½ inch between the upper and lower flutes.

In many embodiments, the plurality of lower flute portions includes a plurality of fastener openings.

Other features and advantages of the present invention will be understood upon reading and understanding the detailed description of the preferred exemplary embodiments, found herein below, in conjunction with reference to the drawings, in which like numerals represent like elements.

DETAILED DESCRIPTION

Many embodiments described below can be utilized as wall sheathing to resist external excitations such as wind or earthquake of light-framed wall structures.

I. Exemplary Shear Panel

In many embodiments, sheet metal is cold-formed to create a recurring corrugation pattern across the width of the sheet. This corrugation pattern is referred to as the sheet profile and consists of top flutes, bottom flutes, and webs as illustrated in FIG. 7.

Figure 1:
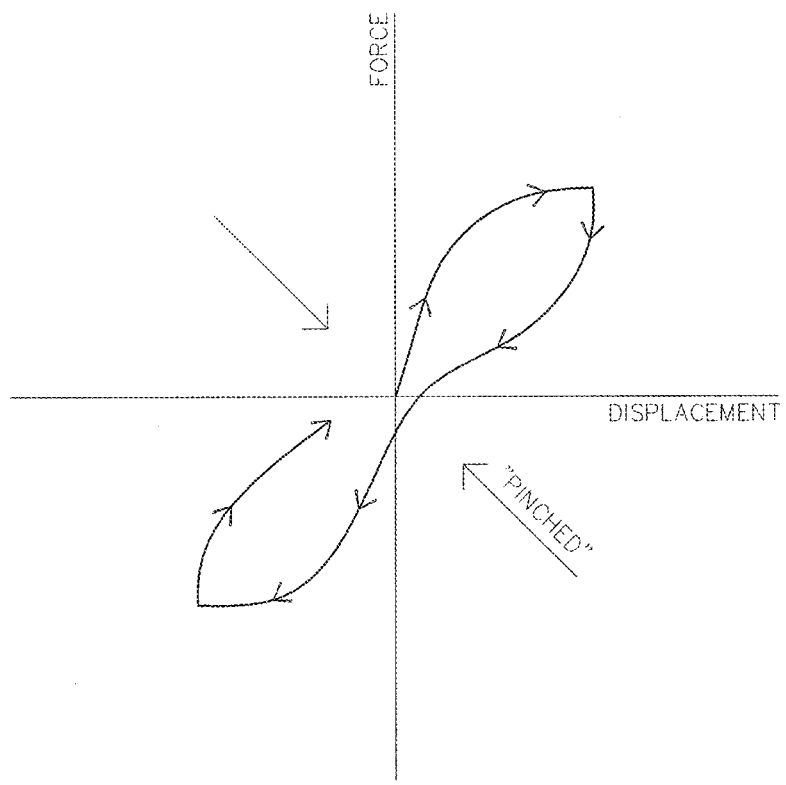
FIG. 1 is a generic graph illustrating a pinched hysteresis loop, according to the prior art.
Figure 2:
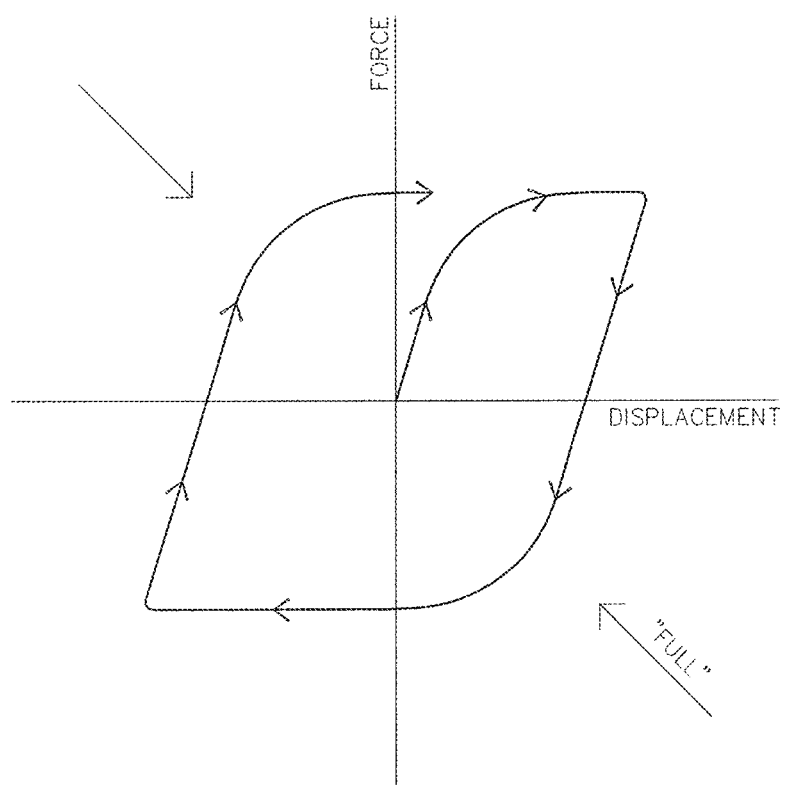
FIG. 2 is a generic graph illustrating a full hysteresis loop, according to the prior art.
Figure 3:
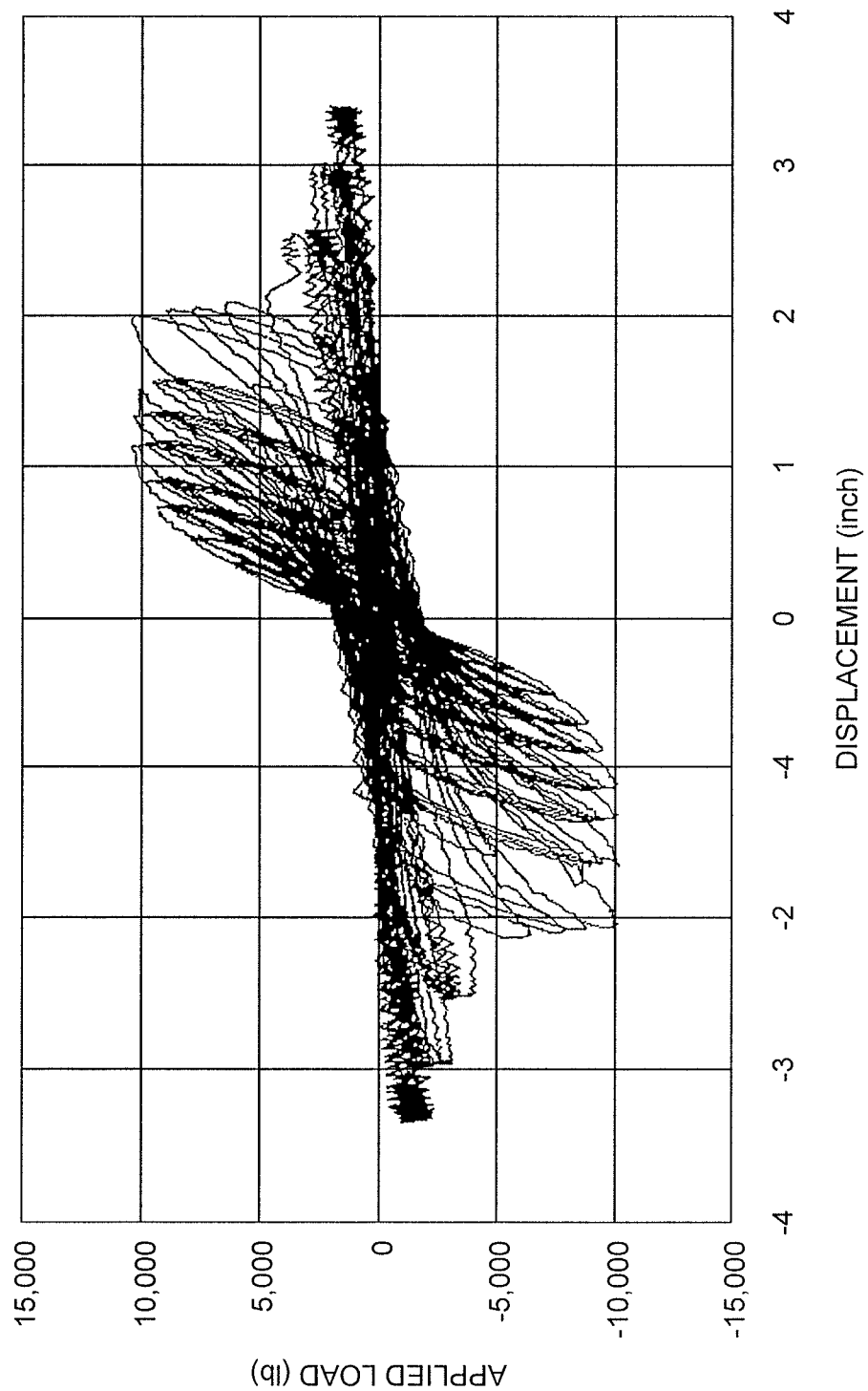
FIG. 3 is a graph of a hysteresis loop of prior art for plywood sheathing fastened to wood studs where the failure mode is bending and pull out of the fastener, according to the prior art.
Figure 4:
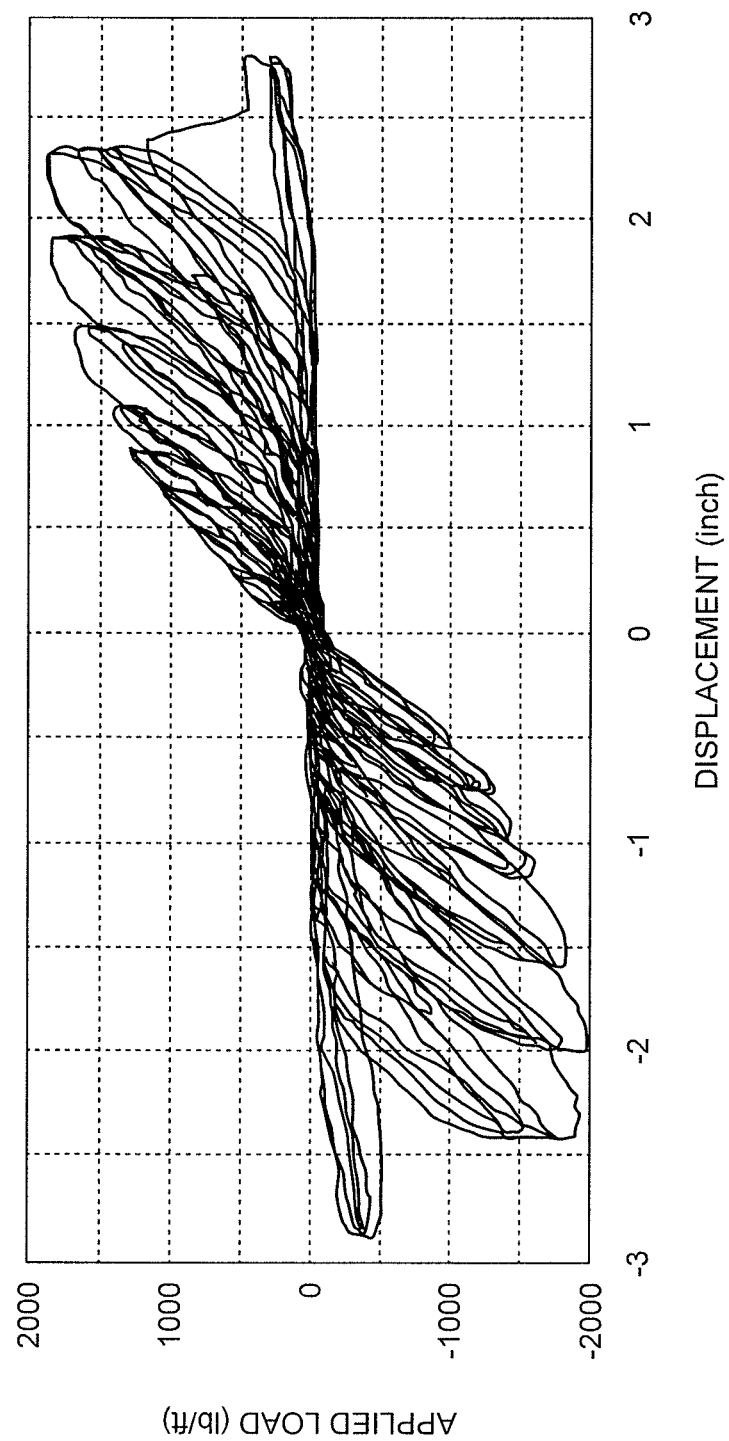
FIG. 4 is a graph of a hysteresis loop of prior art for plywood sheathing fastened to cold-formed steel studs where the failure mode is gouging and tearing of the sheet metal at the fastener, according to the prior art.
Figure 5:
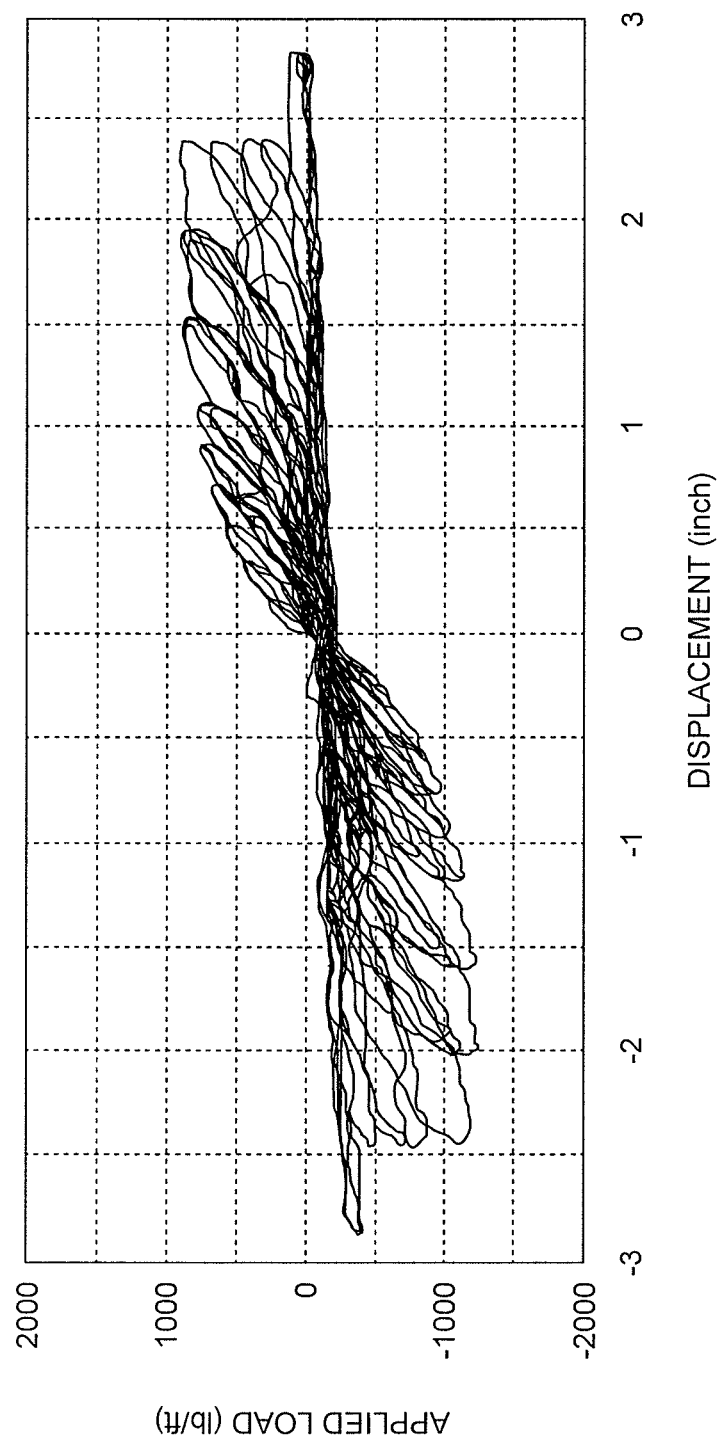
FIG. 5 is a graph of a hysteresis loop of prior art for sheet metal sheathing fastened to cold-formed steel studs where the failure mode is gouging and tearing of the sheet metal at the fastener, according to the prior art.
Figure 6:
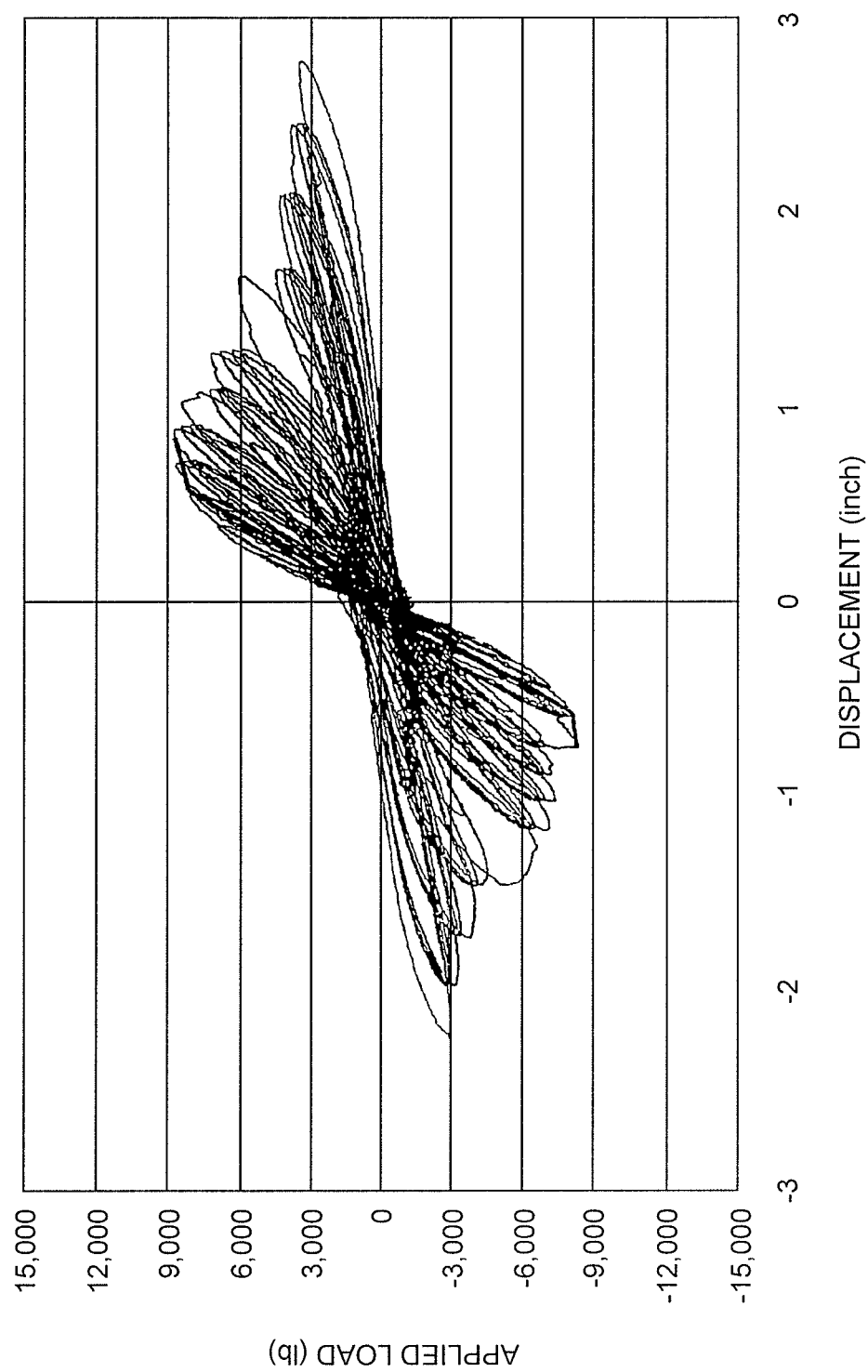
FIG. 6 is a graph of a hysteresis loop of prior art for Sure-Board® sheathing fastened to cold-formed steel studs where the failure mode is gouging and tearing of the sheet metal at the fastener, according to the prior art.
Figure 7:
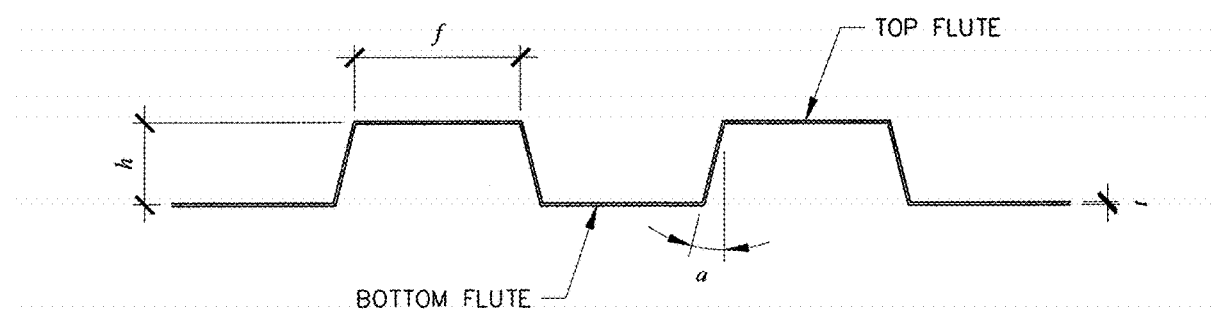
FIG. 7 is a schematic illustration of a generic cold-formed corrugated steel deck profile, according to many embodiments.
Figure 8:
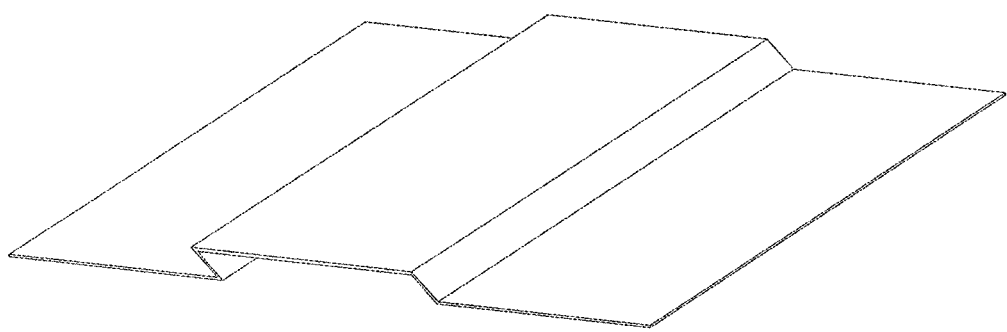
FIG. 8 is a schematic illustration of a top flute deformed laterally at the end of a flute, according to many embodiments.

In many embodiments, the slope of the profile web, as defined by the angle (a) illustrated in FIG. 7, is set to insure that the top flutes deform laterally and yield at the end of the flute, as illustrated in FIG. 8, before any basic failure mode occurs thus providing a full hysteresis loop. Ideally, this angle would be set at 0°; however, shipping and handling of the product will, in all likelihood, necessitate that the angle be greater than 0°. It should be noted that as the angle increases, the stiffness of the flute increases, thus decreasing the likelihood that the top flutes will deform laterally and yield at the end of the flute before gouging or tearing of the sheet metal at the fastener occurs.

The length of the top flute (f) is set to control the stiffness of the sheathing. The height of the flute profile (h) is set to control the stiffness of the sheathing. The thickness of the sheet metal (t) can be configured to control the strength of the sheathing. It should be noted that as one or more of the length (f), height (h), and thickness (t) of the sheet metal increases, the strength of the sheathing increases. Accordingly, these attributes are configured to achieve the desired failure mode as illustrated in FIG. 8.

While there are numerous combinations of the above variables (slope of the profile web, length of the top flute, and height of the flutes), there are only a few combinations that are practical for commercial use. The most practical height (h) is ½ in (25.4 mm), since the most common wall sheathing used in light-framed wall structures is ½ in thick plywood sheets. By matching the thickness of the plywood sheet, many embodiments can be directly substituted for plywood sheathing without increasing the thickness of the wall assembly. One example of a custom rolled profile would have the following attributes: (t)=0.0346, (f)=2.875, and (a)=7°. For example, assuming a desired yield strength 50 ksi with two #12 wood screws used fasten the sheathing to the wall framing at the bottom of each flute, the sheathing would have an allowable shear value of about 1300 plf ASD. By varying the thickness (t) of the sheet metal and the size of the screws while keeping the other variables constant, allowable shear values ranging from about 500 plf ASD to about 2300 plf ASD can be achieved.

Figure 9A:
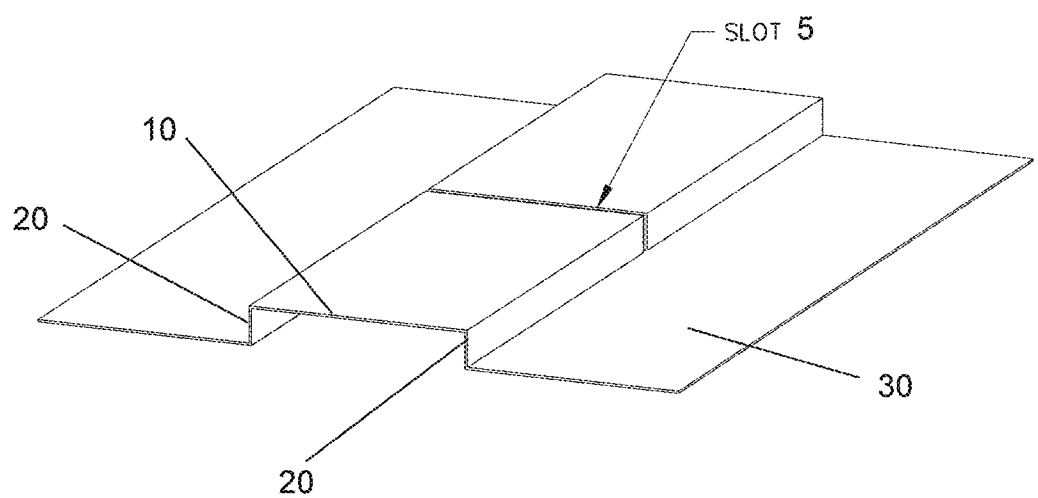
FIGS. 9A-9C are schematic illustrations of corrugated sheet metal sheathing showing different types of transverse openings in a top flute, according to many embodiments.

In many embodiments, a transverse opening, such as a plurality of slots is added in each top flute and adjacent webs at a regular interval along the length of the sheathing panel as illustrated in FIG. 9A. The purpose of this slot is to increase the displacement capacity of the sheathing panel thus providing a long hysteresis loop and more ductility. The slots subdivide the sheet into multiple subpanels allowing the top flutes of each subpanel to deform laterally and yield at the end of the flute independent of the adjacent subpanel over the length of the sheet. The width of the slots 5 may range from 1/64" to ¼" and be continuous across upper flutes 10 and adjacent webs 20. Notably, the slots do not extend in the lower flutes 30. The webs may be at an angle that ranges from 90-100 degrees with respect to the flutes.

Figure 9B:
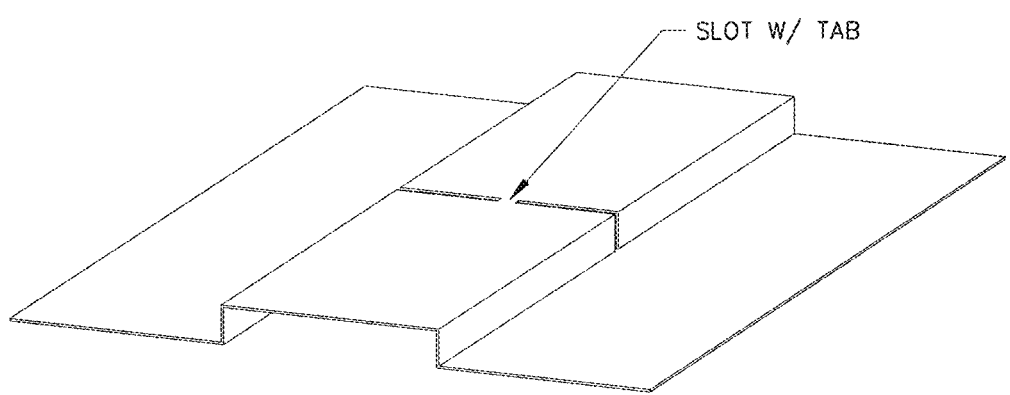
Figure 9C:
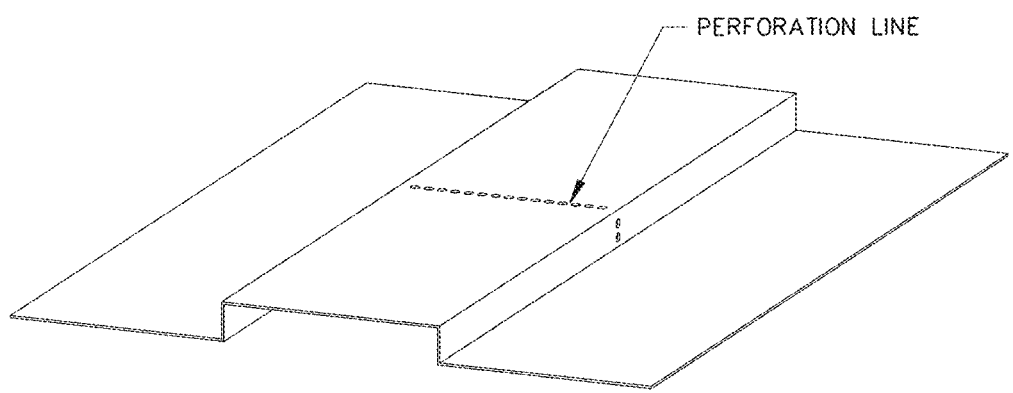

The openings can be non-continuous along the upper flutes and webs, such as the embodiment shown in FIG. 9B. This can be helpful during construction, since the shear panel with non-continuous openings can be easier to handle as compared to a fully slotted shear panel. In addition, different types of openings can be used, such as a pattern of holes shown in FIG. 9C.

Figure 9D:
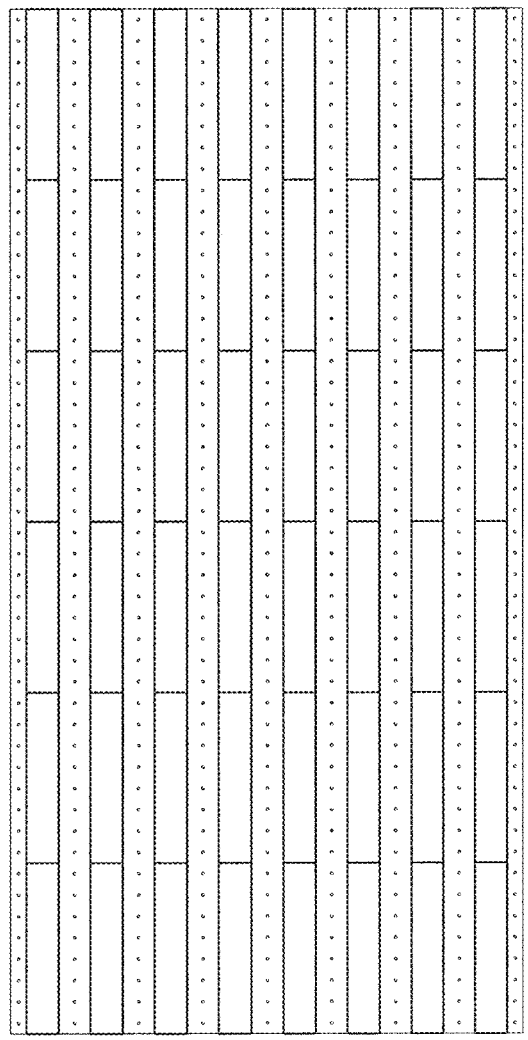
FIG. 9D is a schematic illustration of corrugated sheet metal sheathing with holes added as a means for locating the fasteners and simplifying their installation, according to many embodiments.

In many embodiments, a pattern of fastener holes is added to the wall sheathing to act as a template to insure the proper placement of the fasteners and to simplify the installation of the fasteners. FIG. 9D illustrates one possible pattern for the holes, according to many embodiments. In the case of wood studs, several types of fastening methods could be used including use of nails, screws, power driven pins, and adhesives. For attachment to steel studs, several types of fastening methods could be used including use of self-tapping screws, power driven pins, and welding. The type, size and spacing of the fasteners are set to insure that the top flutes deform laterally and yield at the end of the flute before any basic failure mode occurs.

The displacement capacity of the panel equals the sum of the displacement capacities of the subpanels. It should be noted that when the top flutes deform laterally and yield at the end of the flute, each end of the panel will deform in the opposite direction. This being the case, the maximum distance a panel can deform is equal to two times the height of the flute before a failure mode sets in. For example, if an 8' high×8' long light-framed wall is sheathed with two 4'×8' sheets of wall sheathing installed vertically and the desired drift ratio is 4%, then the wall sheathing must be able to deform 4" over the height of the wall; therefore, assuming the height of the typical flute is set at ½", the maximum displacement the sheathing panel can undergo without any top flute slots being added would be about 1" (two times the height of the flute) and the drift ratio would be about 1% (1"/96").

In order for the sheathing to meet the desired 4% drift ratio, the flutes would have to yield and deform laterally at the end of the flute four times (1"×4=4") over the height of the wall (length of the sheet). This means the top flutes would have to yield and deform laterally at the end of the flute every 24" (24"×4=96"). Therefore, by placing a horizontal slot in each top flute and adjacent webs at an interval of 24", the sheathing panel can deform 4" over the height of the wall before the onset of a basic failure mode.

Figure 10:
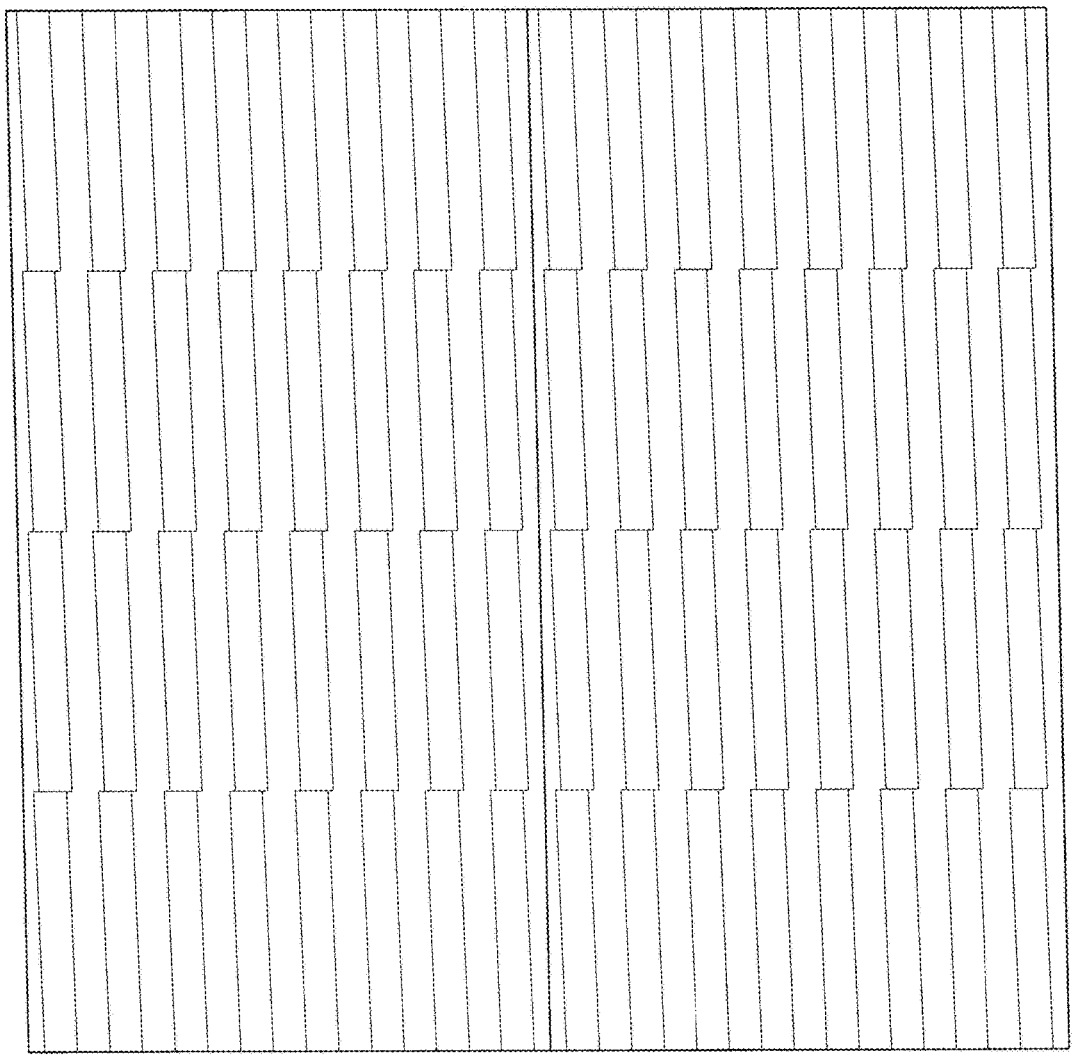
FIG. 10 is a schematic illustration of the deformed shape of an 8' high×8' long light-framed wall sheathed with two 4'×8' sheets of corrugated sheet metal sheathing installed with the flutes running vertically. Each 4'×8' sheet is subdivided into four 24" long segments deforming over its length.
Figure 11:
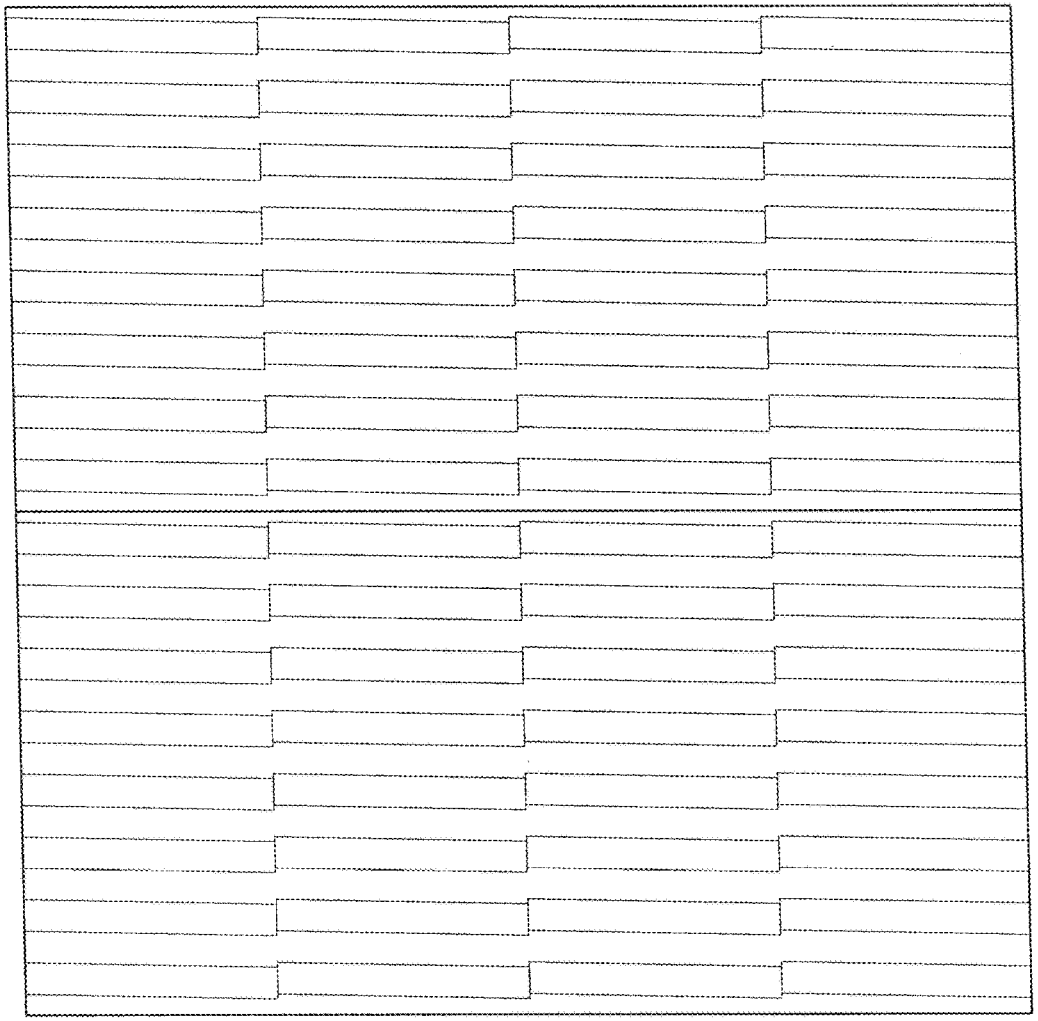
FIG. 11 is a schematic illustration of the deformed shape of an 8' high×8' long light-framed wall sheathed with two 4'×8' sheets of corrugated sheet metal sheathing installed with the flutes running horizontally. Each 4'×8' sheet is subdivided into four 24" long segments deforming over its length.

The deformed shape of an 8' high×8' long light-framed wall with the flutes installed vertically according to many embodiments is illustrated in FIG. 10. The deformed shape of an 8' high×8' long light-framed wall sheathed with two 4'×8' sheets with the flutes installed horizontally according to many embodiments is illustrated in FIG. 11.

II. Test Results

A test was performed on three types of shear panel. The first type of shear panel was a non-slotted corrugated shear panel attached to three studs evenly across the width of the panel. The second type of shear panel according to many embodiments was a corrugated shear panel subdivided by a single series of slots and attached to three studs evenly across the width of the panel. The third type of shear panel according to many embodiments was a corrugated shear panel subdivided by a two series of slots and attached to four studs evenly across the width of the panel.

Each shear panel was tested by applying a series of static loads to the free end of the panel. Loads were recorded at ⅛"

displacement intervals. Test results confirmed that adding the slots increased the displacement capacity of the shear panel.

Figure 12A:
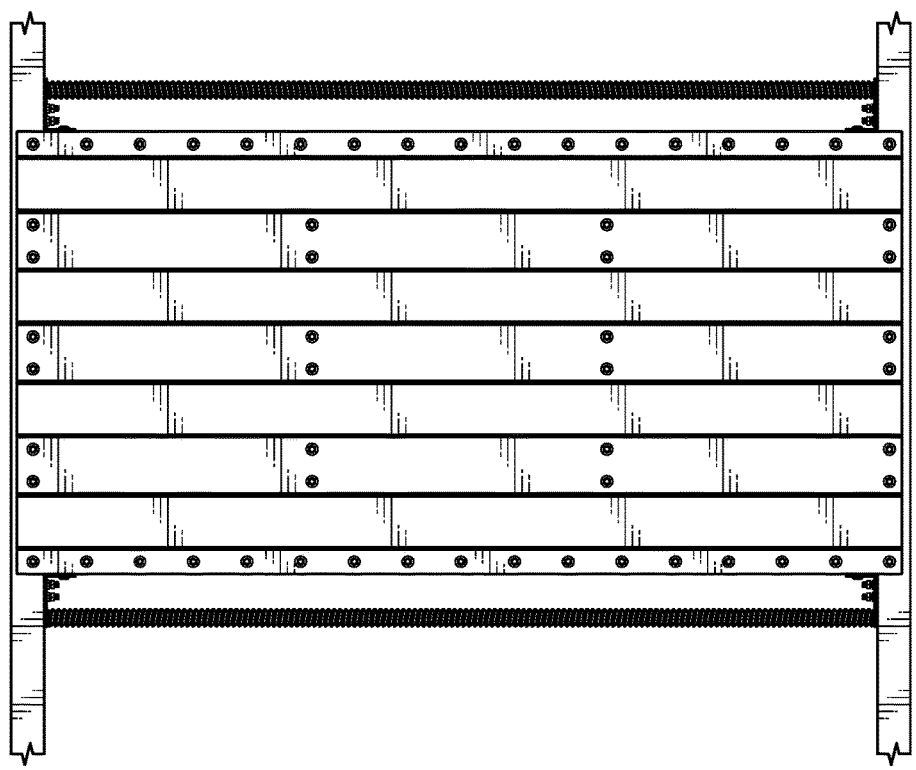
FIGS. 12A and 12B are respectively before and after photographs of the first type (non-slotted) of shear panel.
Figure 12B:
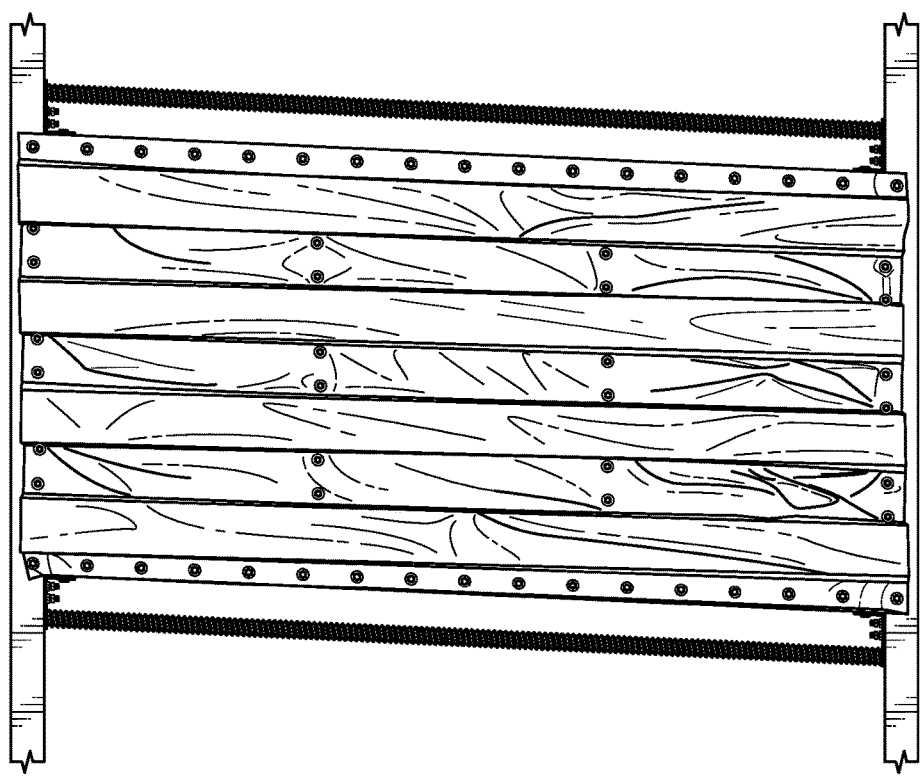
Figure 12C:
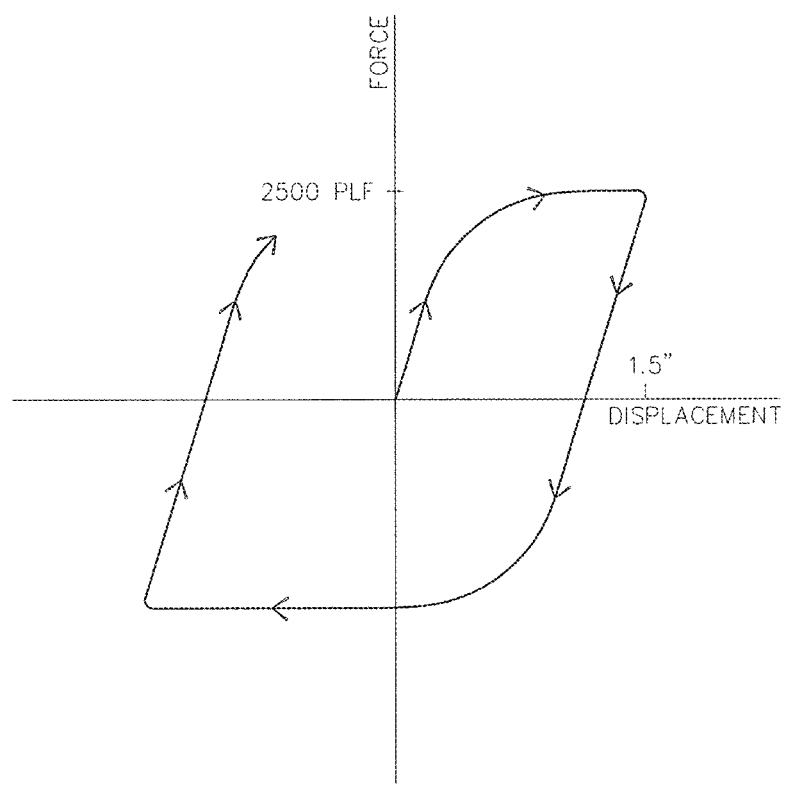
FIG. 12C is the hysteresis loop for the first type (non-slotted) of shear panel.

FIG. 12A and FIG. 12B show before and after photos of the first type (non-slotted) of shear panel while FIG. 12C is the resulting hysteresis loop for the shear panel. Here, it is evident that the displacement is limited to 1.5 inches resulting in a drift ratio of 3%.

Figure 13A:
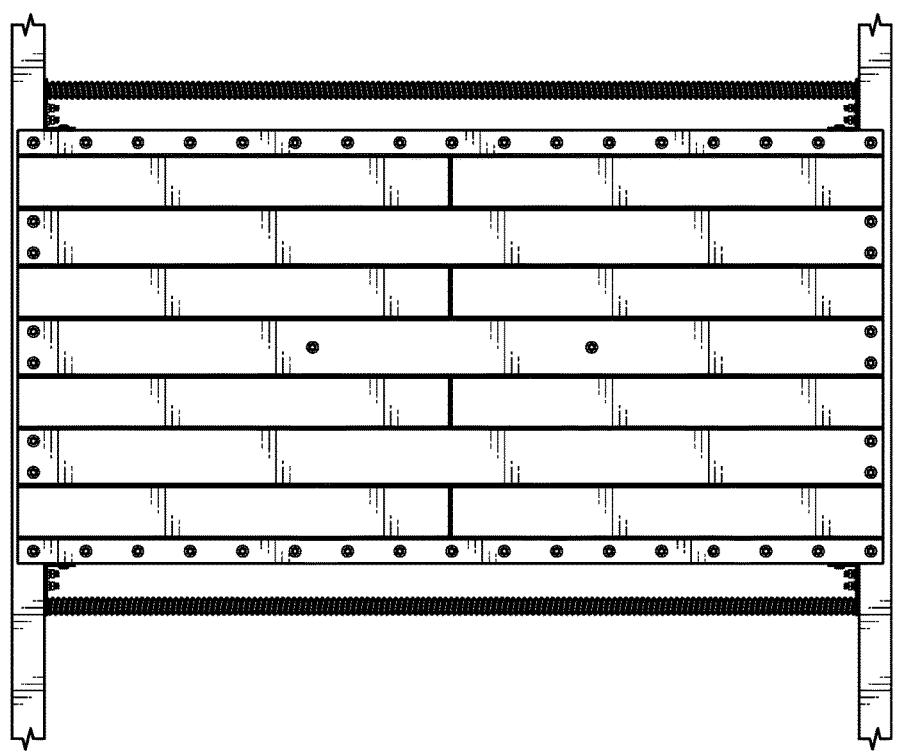
FIGS. 13A and 13B are respectively before and after photographs of the second type (one series of slots) of shear panel.
Figure 13B:
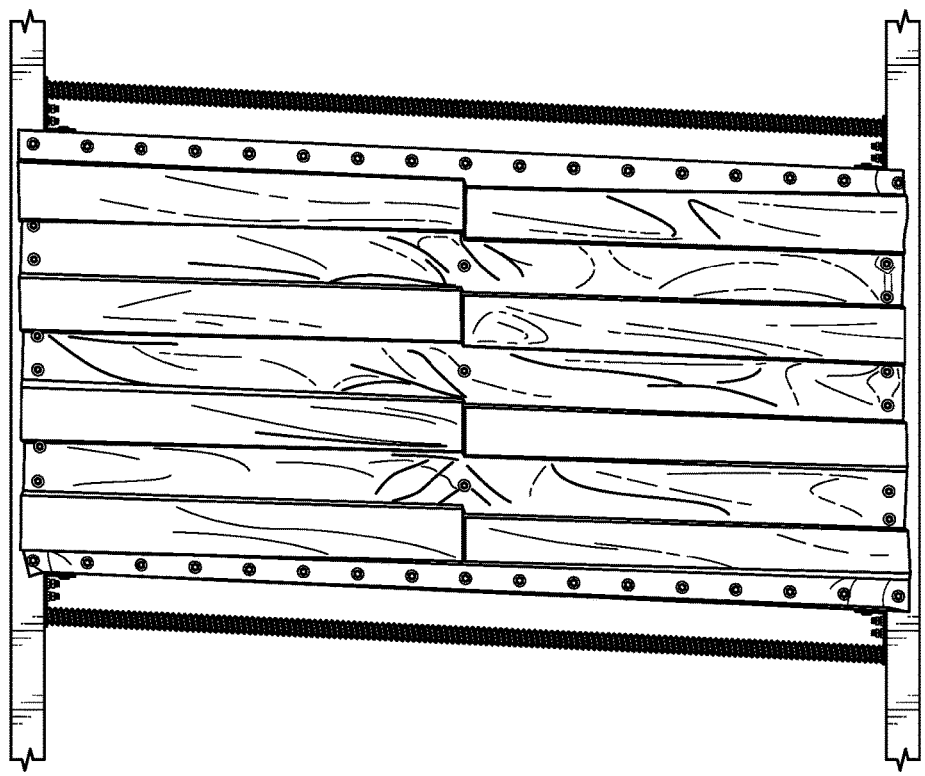
Figure 13C:
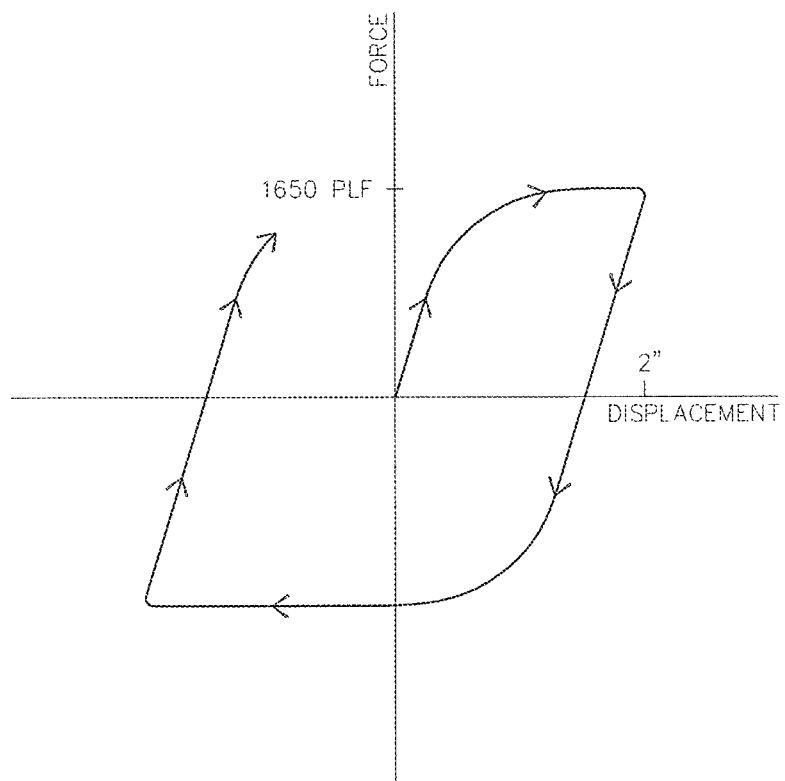
FIG. 13C is the hysteresis loop of the second type (one series of slots) of shear panel.

FIG. 13A and FIG. 13B show before and after photos of the second type (one series of slots) of shear panel while FIG. 13C is the resulting hysteresis loop for the shear panel Here, it is evident that the displacement increases to 2.25 inches resulting in a drift ratio of 4.5%.

Figure 14A:
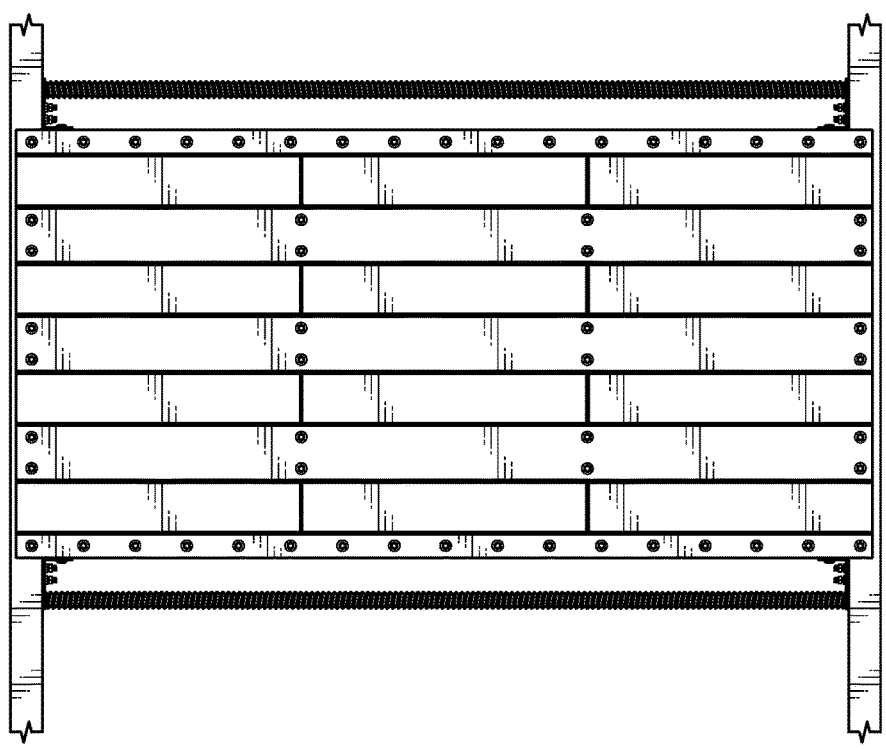
FIGS. 14A and 14B are respectively before and after photographs of the third type (two series of slots) of shear panel.
Figure 14B:
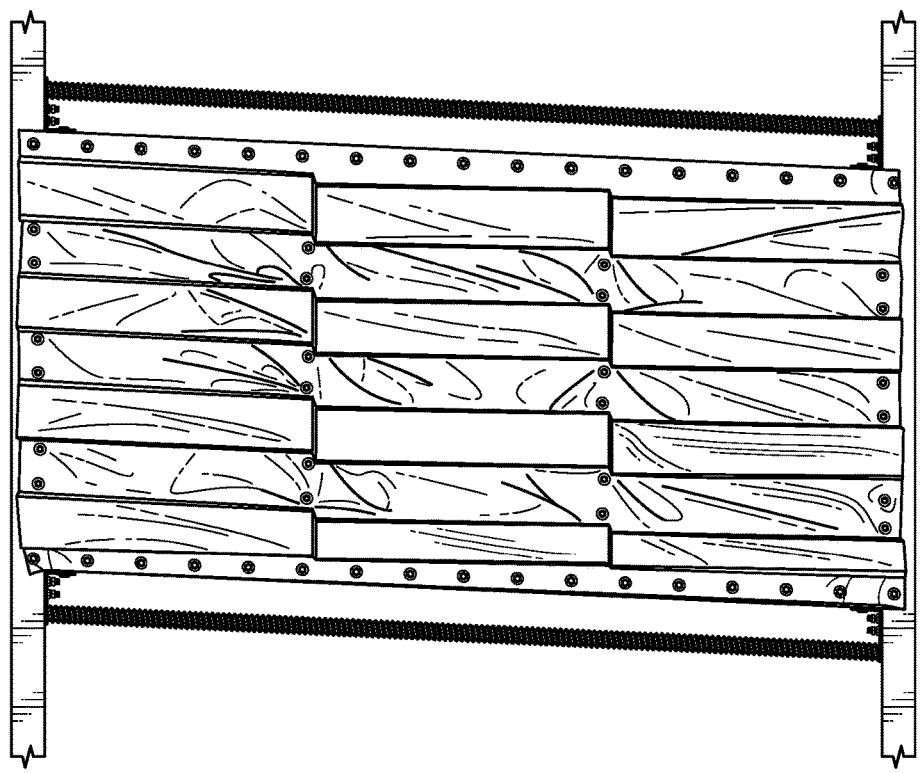
Figure 14C:
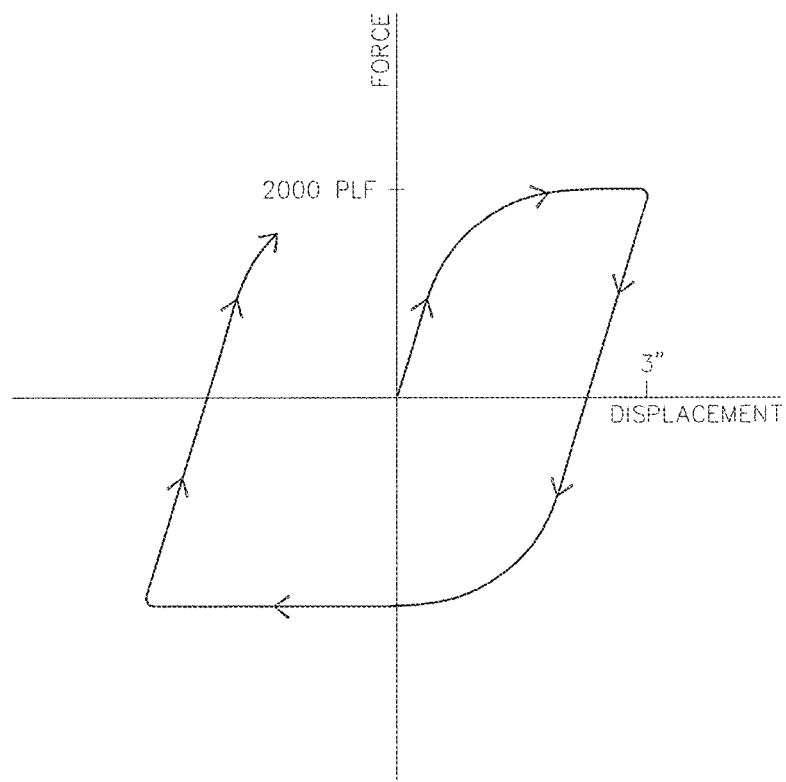
FIG. 14C is the hysteresis loop of the third type (two series of slots) of shear panel.

FIG. 14A and FIG. 14B show before and after photos of the third type (two series of slots) of shear panel while FIG. 14C is the resulting hysteresis loop for the shear panel. Here, it is evident that the displacement increases to 3 inches resulting in a drift ratio of 6%.

As shown above, the hysteresis loops of the slotted panels of FIGS. 13A and 14A have a marked and surprising improvement over the prior art panel shown at FIG. 12A. The panel of FIG. 13A provides 0.75 inches more displacement (50% improvement) than the panel of FIG. 12A, while the panel of FIG. 13B provides 1.5 inches more displacement (100% improvement). Accordingly, embodiments of the invention provide increased passive energy dissipation as measured by the fullness and length of the hysteresis loops shown at FIGS. 13C and 14C, as compared to the limited energy dissipation of the prior art panel as evidenced at FIG. 12C.

Although the invention has been described with reference to specific exemplary embodiments, it will be appreciated that it is intended to cover all modifications and equivalents within the scope of the appended claims.

What is claimed is:

1. A shear wall comprising:
   a plurality of vertical studs;
   a structural shear panel comprising:
      a corrugated sheet metal panel extending in a horizontal direction and vertical direction along a vertical plane, the corrugated sheet metal panel having a plurality of upper flute portions, a plurality of lower flute portions, and a plurality of web portions interconnecting the upper and lower flute portions, the pluralities of upper flute portions, lower flute portions, and web portions all being elongated along the horizontal direction;
      a first plurality of openings that linearly extend along the vertical direction through the plurality of upper flute portions and through the plurality of webs, but not through the lower flute portions,
      wherein the first plurality of openings are configured such that shear forces applied to the corrugated sheet metal panel cause first preferential deformation in a first subpanel of the corrugated sheet metal panel, the first subpanel being defined at least in part by a first vertically-oriented edge and the first plurality of openings; and
      a second plurality of openings that linearly extend along the vertical direction, parallel to the first plurality of openings, through the plurality of upper flute portions and plurality of web portions, but not through the lower flute portions,
      wherein the second plurality of openings are configured such that shear forces applied to the corrugated sheet metal panel cause second preferential deformation in a second subpanel of the corrugated sheet metal panel and third preferential deformation in a third subpanel of the corrugated sheet metal panel, the second subpanel being defined at least in part by the first plurality of openings and the second plurality of openings, the third subpanel being defined at least in part by the second plurality of openings and a second vertically-oriented edge,
      wherein the first plurality of openings and the second plurality of openings allow the upper flute portions to deform freely, and wherein the first plurality of openings and the second plurality of openings are spaced at an interval that enables a drift ratio from 3% to 6% in the corrugated sheet metal panel and a graphic depiction of the shear forces and resulting preferential deformation to comprise a full non-pinched hysteresis loop; and
   a plurality of fasteners fastening the structural shear panel to the plurality of studs.

2. The shear wall of claim 1, wherein the first plurality of openings and the second plurality of openings are spaced at an interval that enables a drift ratio of 4.5% to 6% in the corrugated sheet metal panel.

3. The shear wall of claim 1, wherein the pluralities of the upper and lower flute portions are orientated 90-100 degrees from the plurality of web portions.

4. The shear wall of claim 1, wherein a third plurality of openings linearly extend along the vertical direction, parallel to the first and second pluralities of openings, through the plurality of upper flute portions and plurality of web portions, but not through the lower flute portions.

5. The shear wall of claim 1, wherein the corrugated sheet metal panel is 4×8 ft.

6. The shear wall of claim 1, wherein webs extend ½ inch between the upper and lower flutes.

7. The shear wall of claim 1, further comprising:
   a first plurality of fastener openings included in the plurality of lower flute portions.

8. The shear wall of claim 7, further comprising:
   a second plurality of fastener openings included in the plurality of lower flute portions.

9. The shear wall of claim 8, wherein the first plurality of fastener openings are in line with the first plurality of openings, wherein the first plurality of openings and the first plurality of fastener openings are aligned with a first vertical stud of the plurality of vertical studs,
   wherein the second plurality of fastener openings are in line with the second plurality of openings, and wherein the second plurality of openings and the second plurality of fastener openings are aligned with a second vertical stud of the plurality of vertical studs.

10. The shear wall of claim 1, wherein the first plurality of openings are spaced 16 inches in the horizontal direction from the first edge, wherein the second plurality of openings are spaced 16 inches in the horizontal direction from the first plurality of openings, and wherein the second edge is spaced 16 inches in the horizontal direction from the second plurality of openings.

11. The shear wall of claim 1, wherein the first plurality of openings are spaced 24 inches in the horizontal direction from the first edge, wherein the second plurality of openings are spaced 24 inches in the horizontal direction from the first plurality of openings, and wherein the second edge is spaced 24 inches in the horizontal direction from the second plurality of openings.

12. The shear wall of claim 1, wherein each opening in the first plurality of openings and the second plurality has the same width, wherein the width is in the range of 1/64 inch to 1/4 inch.

13. The shear wall of claim 12, wherein the width is in the range of 1/64 inch to 1/8 inch.

\* \* \* \* \*